US011496521B2

(12) United States Patent
Byron et al.

(10) Patent No.: US 11,496,521 B2
(45) Date of Patent: Nov. 8, 2022

(54) FEEDBACK LOOP FOR SECURITY AUDIT LOGS

(71) Applicant: International Business Machines Corporation, Armonk, NY (US)

(72) Inventors: Donna K. Byron, Petersham, MA (US); VinodKumar Raghavan Nair, Westford, MA (US); Monica Sundararajan, Lexington, MA (US); Sujana Subedi, Lexington, MA (US); Nurdan Vijayadharan, Groton, MA (US)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 16/991,610

(22) Filed: Aug. 12, 2020

(65) Prior Publication Data
US 2022/0053024 A1   Feb. 17, 2022

(51) Int. Cl.
*H04L 9/40* (2022.01)
*G06N 5/04* (2006.01)
*G06N 20/00* (2019.01)
*G06F 16/28* (2019.01)

(52) U.S. Cl.
CPC ............ *H04L 63/20* (2013.01); *G06F 16/285* (2019.01); *G06N 5/04* (2013.01); *G06N 20/00* (2019.01)

(58) Field of Classification Search
None
See application file for complete search history.

(56) References Cited

U.S. PATENT DOCUMENTS

| 10,275,285 | B1 | 4/2019 | Gold et al. |
| 10,296,258 | B1 | 5/2019 | Richardson |
| 10,310,760 | B1 | 6/2019 | Dreier et al. |
| 10,523,681 | B1 * | 12/2019 | Bulgakov ............. H04L 63/102 |

(Continued)

FOREIGN PATENT DOCUMENTS

| CN | 108881194 A | 11/2018 |
| CN | 109101527 A | 12/2018 |

OTHER PUBLICATIONS

"System and method for end-to-end regulatory compliance in customer support," ip.com, An IP.com Prior Art Database Technical Disclosure, IP.com No. IPCOM000227768D, IP.com Electronic Publication Date: May 15, 2013, 5 pages.

(Continued)

*Primary Examiner* — Cai Y Chen
(74) *Attorney, Agent, or Firm* — Grant Johnson

(57) ABSTRACT

A method for controlling transmission of security audit logs based on a model, a method for controlling transmission of log data based on a model, and a logging system. One embodiment may comprise receiving transmitted log information from a plurality of nodes, applying a rule-based algorithm to the transmitted log information to categorize a first batch of data as included in a security analysis, a second batch of data as excluded from the security analysis, and a third batch of data as actually reviewed in the security analysis based on a user selection, training a classifier based on outcomes of the rule-based algorithm, converting the classifier to run as a trained model executable on the plurality of nodes, and transmitting the trained model executable to the plurality of nodes.

20 Claims, 8 Drawing Sheets

(56) References Cited

U.S. PATENT DOCUMENTS

2019/0327293 A1* 10/2019 Martini ............... H04L 41/0893
2020/0210455 A1* 7/2020 Margel .................... H04L 43/20
2020/0334093 A1* 10/2020 Dubey ................ G06F 11/0778

OTHER PUBLICATIONS

"Method and System for Privacy Preserving and Audit Compliant Reporting and Analysis of Individual Actions in Managed Cloud Environments," ip.com, An IP.com Prior Art Database Technical Disclosure, IP.com No. IPCOM000248992D, IP.com Electronic Publication Date: Jan. 25, 2017, 4 pages.

Kelley et al., "User Behavior Profiling Using Policy Decisions," ip.com, An IP.com Prior Art Database Technical Disclosure, IP.com No. IPCOM000253746D, IP.com Electronic Publication Date: Apr. 30, 2018, 4 pages.

"Quantifying risk in operationalizing ML models," ip.com, An IP.com Prior Art Database Technical Disclosure, IP.com No. IPCOM000258892D, IP.com Electronic Publication Date: Jun. 22, 2019, 5 pages.

Sheikh et al., "A Rule-Based System to Extract Financial Information," Research Gate, Journal of Computer Information Systems, Jun. 2012, 11 pages.

Zomlot et al., "Aiding Intrusion Analysis Using Machine Learning," Printed Feb. 6, 2020, 8 pages.

Reeve et al., "Automatically Redacting Logs," U.S. Appl. No. 16/749,351, filed Jan. 22, 2020.

Mell et al., "The NIST Definition of Cloud Computing," Recommendations of the National Institute of Standards and Technology, U.S. Department of Commerce, Special Publication 800-145, Sep. 2011, 7 pages.

"Credential redaction," databricks, Apr. 7, 2020, 2 pages, https://docs.databricks.com/user-guide/security.html.

* cited by examiner

FEEDBACK LOOP FOR SECURITY AUDIT LOGS

BACKGROUND

Aspects of the present disclosure relate to computer security in distributed systems; more particular aspects relate to methods for limiting transmission of logging information in distributed systems to reduce congestion.

The development of the EDVAC computer system of 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push the performance of the computer higher and higher, even more advanced computer software has evolved to take advantage of the higher performance of the hardware, resulting in computer systems today that are much more powerful than just a few years ago.

One particular area in which such advances have been made is in the use of microservices. Microservices generally refer to an architectural style that divides an application program into components, where each component is a full, but miniature, application that is focused on producing a single task. Microservice architectures typically implement that single task from start to finish, from the graphical user interface (GUI) to the database, or at least from the service application programming interface (API) to the database, so that different GUIs and client apps can reuse the same task functionality. Microservices typically have a well-defined interface and dependencies (to other microservices and to external resources) so that they can run fairly independently, and thus, can be developed fairly independently.

SUMMARY

According to embodiments of the present disclosure, a method for controlling transmission of security audit logs based on a model. One embodiment may comprise receiving transmitted log information from a plurality of nodes, applying a rule-based algorithm to the transmitted log information to categorize a first batch of data as included in a security analysis, a second batch of data as excluded from the security analysis, and a third batch of data as actually reviewed in the security analysis based on a user selection, training a classifier based on outcomes of the rule-based algorithm, converting the classifier to run as a trained model executable on the plurality of nodes, and transmitting the trained model executable to the plurality of nodes.

According to embodiments of the present disclosure, a computer-implemented method for controlling transmission of log data based on a model. One embodiment may comprise receiving a trained model executable at an edge node, receiving a first pulse from a collector, selecting a first set of records for transmission based at least in part on the priority score, and transmitting the first set of records to the collector at a rate based at least in part on a value of the first pulse from the collector. The trained model executable in some embodiments may comprise a classifier trained to generate a priority score for a plurality of record based on weightings associated a first batch of training data included in a security analysis, a second batch of training data excluded from the security analysis, and a third batch of data actually reviewed based on a user selection.

According to embodiments of the present disclosure, a logging system. One embodiment may comprise comprising a training module and an agent associated with one of the plurality of edge nodes. The training module may be adapted to receive transmitted log information from a plurality of edge nodes, apply a rule-based algorithm to the transmitted log information to categorize a first batch of data as included in a security analysis, a second batch of data as excluded from the security analysis, and a third batch of data as actually reviewed in the security analysis based on a user selection, train a classifier based on outcomes of the rule-based algorithm, convert the classifier to run as a trained model executable on the plurality of nodes, and transmit the trained model executable to the plurality of edge nodes. The agent may be adapted to receive the trained model executable; assign a priority score to a plurality of records using the trained model executable, receive a first pulse from a collector, select a first set of records for transmission based at least in part on the priority score and on the first pulse from the collector, and transmit the first set of records to the collector.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
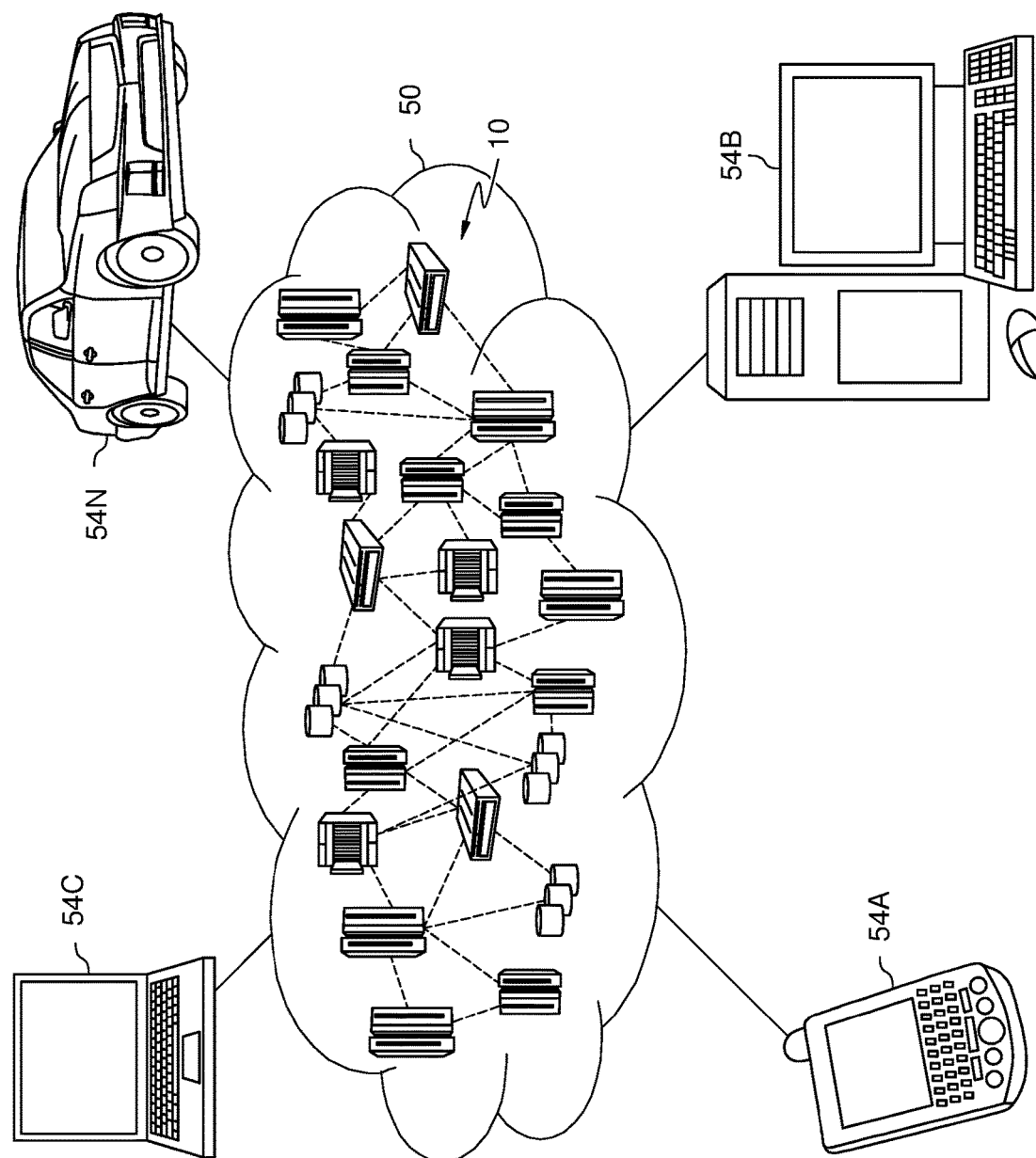
FIG. 1 illustrates a cloud environment, consistent with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer security in distributed systems; more particular aspects relate to methods for limiting transmission of logging information in distributed systems to reduce congestion. While the present disclosure is not necessarily limited to such applications, various aspects of the disclosure may be appreciated through a discussion of various examples using this context.

Many distributed applications, including those built using microservices, include a logging function. Some of these logging functions may record events, status messages, resources used, and/or errors that occur over the life cycle of the distributed application. This data may be used for security audit, development, debugging, and other purposes. Other logging functions may record messages between different users (including other applications and microservices) of a computer system.

In some distributed applications, activity from edge nodes (e.g., client machines sending API requests from a business activity endpoint, such as a retail site; responses to request for sensor output; database access logs, etc.) may be sent to a central collector service to be accumulated for subsequent analysis (e.g., security anomalies). Some systems may send each and every transaction/event, which may cause congestion (e.g., network bandwidth limits, storage bandwidth limits, processing limits) due the volume of messages and/or data that needs to be uploaded. In some cases, this volume of data sent even causes the servers running the central collector service to fail when a payload of data is received that is too large to process.

Accordingly, some embodiments may provide a central manager that may initially allow auditors or other data analysts to define filtering rules for reports they want to pull from a data lake, creating subsets of data-of-interest to the analyst team. As a side-effect, these filtering rules may also act as annotators that create metadata on the data received from each DB node. Subsequently, some of the resulting filtered data records may be actually reviewed by the analysts, such as searching for patterns, security breaches, etc., whereas other records are never actually reviewed. This actual usage history may also be recorded in some embodiments and used as metadata.

Once the data records are chosen by analysts based on filtering rules, an aggregator service in some embodiments may aggregate over all of the resulting reports requested, and generate/learn the patterns of which records need not be sent and other records that should preferentially be sent by the edge nodes. The resulting characterization, along with a variable allowed data transfer volume rate, may be sent back down to the individual edge nodes so that those edge nodes can generate a prioritization score for each record. The edge nodes may use the prioritization score to prioritize the transmission of the most important records, subject to the rate limit specified by the aggregator service. In some embodiments, the edge node data transfer process might use the prioritization scores in a variety of ways to throttle the rate of data sent, such as variably limiting the rate of data sent to the aggregator service, prioritizing the bundling of data within that variable rate limit and/or sending lower priority data at off-peak times.

While some embodiments will be described herein with reference to dynamic throttling between a plurality of edge nodes and a collector service, this disclosure may also be applied to other collection points in a distributed application. For example, data records may be dynamically throttled between an aggregator service and a collector service in some embodiments, or between a central manager and an aggregator service. Similarly, some embodiments may allow for dynamic throttling across more than one layer of the distributed application. For example, an aggregator service in some embodiments may send pulses directly to the edge nodes, rather than to the collector services.

One feature and advantage of some embodiments is that they may provide a feedback loop from a security auditing process to the edge nodes. This feedback loop may limit the rate of data that will be sent to the aggregator service during a time of congestion. Benefits include making the distributed system less expensive to operate, reducing the number of required restarts (thus making the process more reliable), and allowing the processing/data transfer to preferentially allocate time to suspicious data rather than all possible data (thus, making anomaly detection faster). Another feature and advantage of some embodiments is that all data records may still transferred from the edge nodes to the aggregator service for a distributed database deployment.

Another feature and advantage of some embodiments is that they may provide a collector service adapted to send a pulse to each edge node indicating how close the aggregator service is to reaching its maximum capacity. Additionally or alternatively, the collector service in some embodiments may transmit a dynamic throttling percentage to the edge nodes. In an example embodiment, the edge node may employ a labeling model to discriminate between data that is relatively more important to transmit from data that can be either discarded, sent later (i.e., transmission resumed during periods of lower congestion), or sampled, responsive to the pulse and/or the throttling percentage.

The aforementioned advantages are example advantages, and not all advantages are discussed. Furthermore, embodiments of the present disclosure can exist that contain all, some, or none of the aforementioned advantages while remaining within the spirit and scope of the present disclosure.

Cloud Computing

FIG. 1 illustrates an embodiment of a cloud environment, consistent with some embodiments. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain 3resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
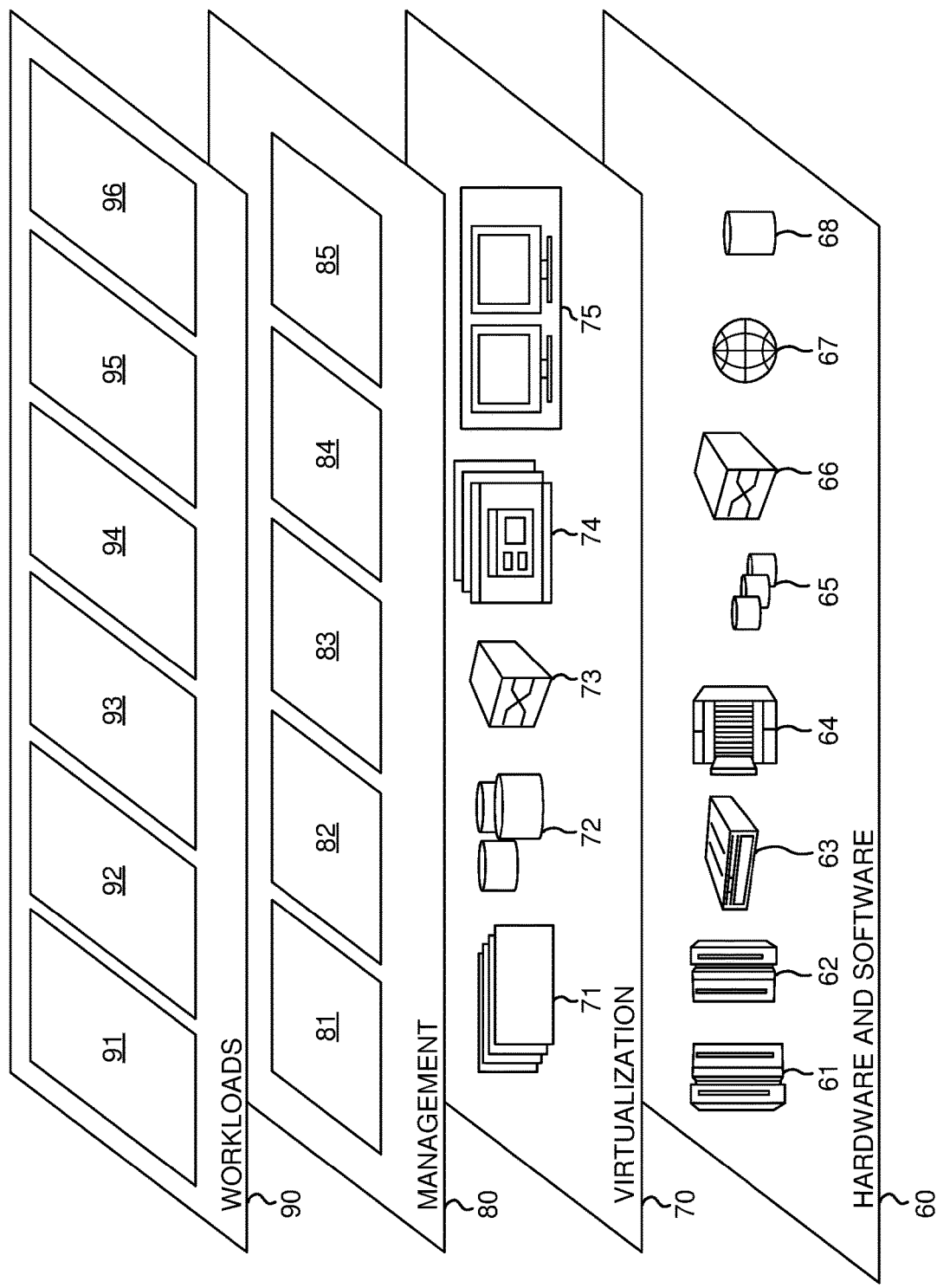
FIG. 2 illustrates a set of functional abstraction layers provided by cloud computing environment, consistent with some embodiments.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and logging service 96.

Data Processing System

Figure 3:
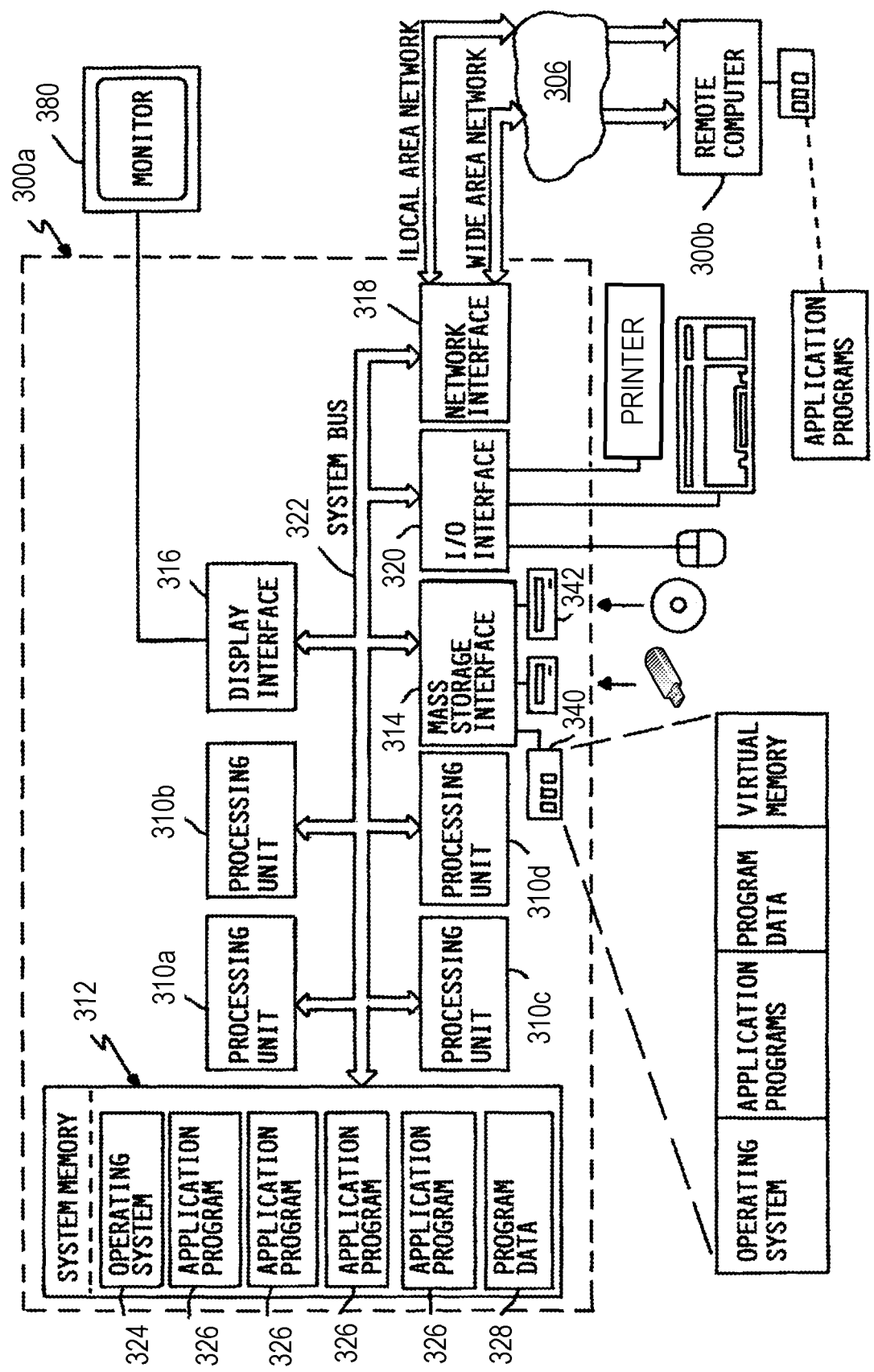
FIG. 3 illustrates an embodiment of a data processing system suitable for use in a cloud environment, consistent with some embodiments.

FIG. 3 illustrates an embodiment of a data processing system (DPS) 300a, 300b (generically DPS 300), suitable for use in as a cloud computing node 10 in a cloud computing environment 50, consistent with some embodiments. In some embodiments, the DPS 300 is implemented as a personal computer; server computer; portable computer, such as a laptop or notebook computer, PDA (Personal Digital Assistant), tablet computer, or smart phone; processors embedded into a larger devices, such as an automobile, airplane, teleconferencing system, appliance; smart devices; or any other appropriate type of electronic device. Moreover, components other than or in addition to those shown in FIG. 3 may be present, and that the number, type, and configuration of such components may vary. Moreover, FIG. 3 only depicts the representative major components of the DPS 300, and individual components may have greater complexity than represented in FIG. 3.

The data processing system 300 in FIG. 3 comprises a plurality of central processing units 310 a-310 d (herein generically referred to as a processor 310 or a CPU 310) connected to a memory 312, a mass storage interface 314, a terminal/display interface 316, a network interface 318, and an input/output ("I/O") interface 320 by a system bus 322. The mass storage interface 314 in this embodiment connect the system bus 322 to one or more mass storage devices, such as a direct access storage device 340 or a readable/writable optical disk drive 342. The network interfaces 318 allow the DPS 300 to communicate with other DPS 300 over the communications medium 306. The memory 312 also contains an operating system 324, a plurality of application programs 326, and program data 328.

The data processing system 300 embodiment in FIG. 3 is a general-purpose computing device. Accordingly, the processors 310 may be any device capable of executing program instructions stored in the memory 312 and may themselves be constructed from one or more microprocessors and/or integrated circuits. In this embodiment, the DPS 300 contains multiple processors and/or processing cores, as is typical of larger, more capable computer systems; however, in other embodiments the computing systems 300 may comprise a single processor system and/or a single processor designed to emulate a multiprocessor system. Further, the processors 310 may be implemented using a number of heterogeneous data processing systems 300 in which a main processor is present with secondary processors on a single chip. As another illustrative example, the processor 310 may be a symmetric multi-processor system containing multiple processors of the same type.

When the data processing system 300 starts up, the associated processor(s) 310 initially execute the program instructions that make up the operating system 324, which manages the physical and logical resources of the DPS 300. These resources include the memory 312, the mass storage interface 314, the terminal/display interface 316, the network interface 318, and the system bus 322. As with the processor(s) 310, some DPS 300 embodiments may utilize multiple system interfaces 314, 316, 318, 320, and busses 322, which in turn, may each include their own separate, fully programmed microprocessors.

Instructions for the operating system, applications and/or programs (generically referred to as "program code," "computer usable program code," or "computer readable program code") may be initially located in the mass storage devices 340, 342, which are in communication with the processors 310 through the system bus 322. The program code in the different embodiments may be embodied on different physical or tangible computer readable media, such as the system memory 312 or the mass storage devices 340, 342. In the illustrative example in FIG. 3, the instructions are stored in a functional form of persistent storage on the direct access storage device 340. These instructions are then loaded into the memory 312 for execution by the processor 310. However, the program code may also be located in a functional form on the computer readable media 342 that is selectively removable and may be loaded onto or transferred to the DPS 300 for execution by the processor 310.

The system bus 322 may be any device that facilitates communication between and among the processors 310; the memory 312; and the interfaces 314, 316, 318, 320. Moreover, although the system bus 322 in this embodiment is a relatively simple, single bus structure that provides a direct communication path among the system bus 322, other bus structures are consistent with the present disclosure, including without limitation, point-to-point links in hierarchical, star or web configurations, multiple hierarchical buses, parallel and redundant paths, etc.

The memory 312 and the mass storage devices 340, 342 work cooperatively to store the operating system 324, the application programs 326, and the program data 328. In this embodiment, the memory 312 is a random-access semiconductor device capable of storing data and programs. Although FIG. 3 conceptually depicts that device as a single monolithic entity, the memory 312 in some embodiments may be a more complex arrangement, such as a hierarchy of caches and other memory devices. For example, the memory 312 may exist in multiple levels of caches, and these caches may be further divided by function, so that one cache holds instructions while another holds non-instruction data, which is used by the processor or processors. Memory 312 may be further distributed and associated with different processors 310 or sets of processors 310, as is known in any of various so-called non-uniform memory access (NUMA) computer architectures. Moreover, some embodiments may utilize virtual addressing mechanisms that allow the DPS 300 to behave as if it has access to a large, single storage entity instead of access to multiple, smaller storage entities such as the memory 312 and the mass storage device 340, 342.

Although the operating system 324, the application programs 326, and the program data 328 are illustrated as being contained within the memory 312, some or all of them may be physically located on different computer systems and may be accessed remotely, e.g., via the communications medium 306, in some embodiments. Thus, while the operating system 324, the application programs 326, and the program data 328 are illustrated as being contained within the memory 312, these elements are not necessarily all completely contained in the same physical device at the same time and may even reside in the virtual memory of other DPS 300.

The system interfaces 314, 316, 318, 320 support communication with a variety of storage and I/O devices. The mass storage interface 314 supports the attachment of one or more mass storage devices 340, 342, which are typically rotating magnetic disk drive storage devices, a solid-state storage device (SSD) that uses integrated circuit assemblies as memory to store data persistently, typically using flash memory, or a combination of the two. However, the mass storage devices 340, 342 may also comprise other devices, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 316 is used to directly connect one or more display units, such as monitor 380, to the data processing system 300. These display units 380 may be non-intelligent (i.e., dumb) terminals, such as an LED monitor, or may themselves be fully programmable workstations used to allow IT administrators and users to communicate with the DPS 300. Note, however, that while the display interface 316 is provided to support communication with one or more display units 380, the computer systems 300 does not necessarily require a display unit 380 because all needed interaction with users and other processes may occur via network interface 318.

The communications medium 306 may be any suitable network or combination of networks and may support any appropriate protocol suitable for communication of data and/or code to/from multiple DPS 300. Accordingly, the network interfaces 318 can be any device that facilitates such communication, regardless of whether the network connection is made using present day analog and/or digital techniques or via some networking mechanism of the future. Suitable communication media 306 include, but are not limited to, networks implemented using one or more of the "Infiniband" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols can be used to implement the communications medium 306. The Transmission Control Protocol/Internet Protocol ("TCP/IP") suite contains suitable network and transport protocols.

Distributed Application Architectures

Figure 4A:
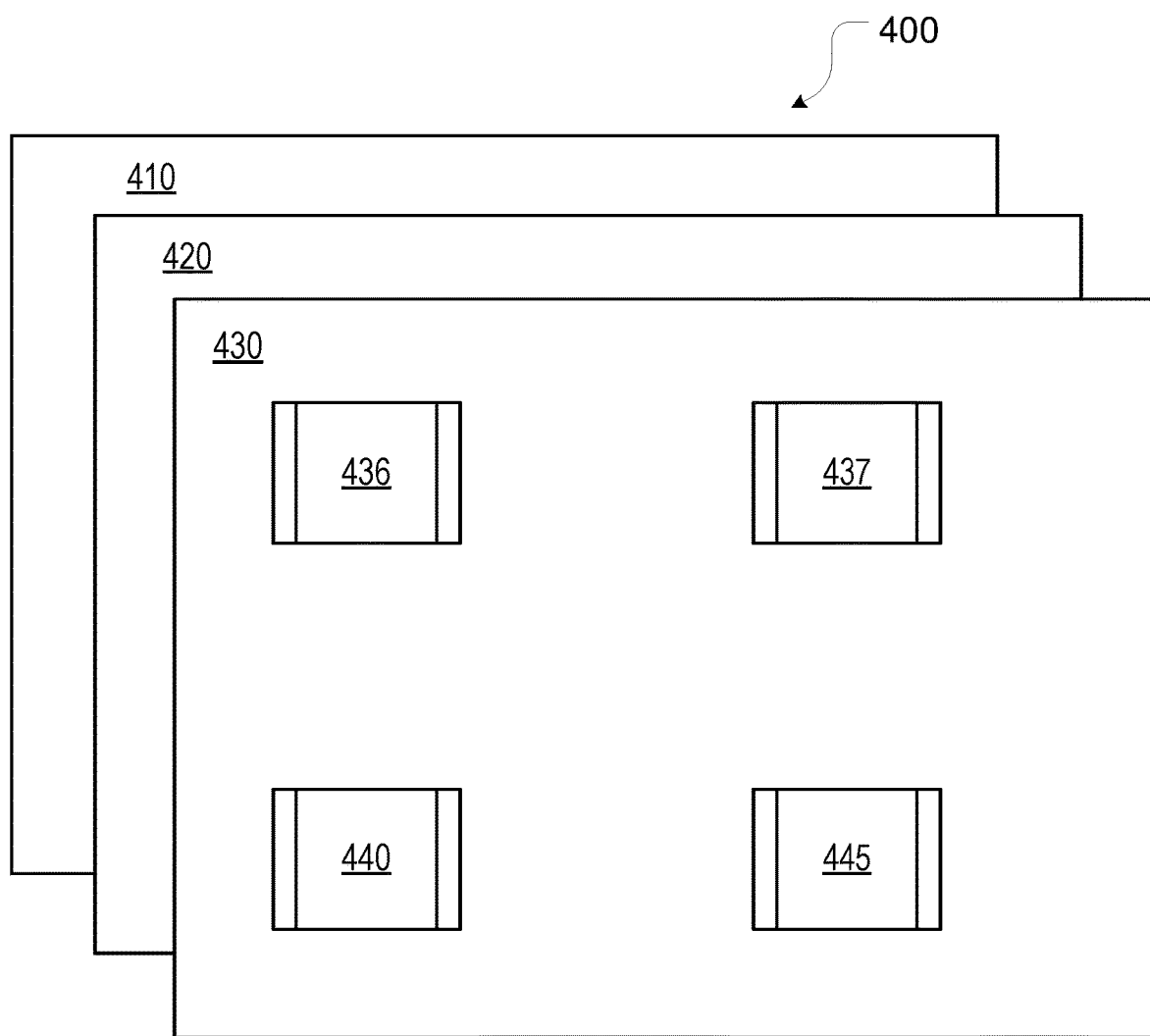
FIG. 4A depicts an example monolithic service architecture, consistent with some embodiments.
Figure 4B:
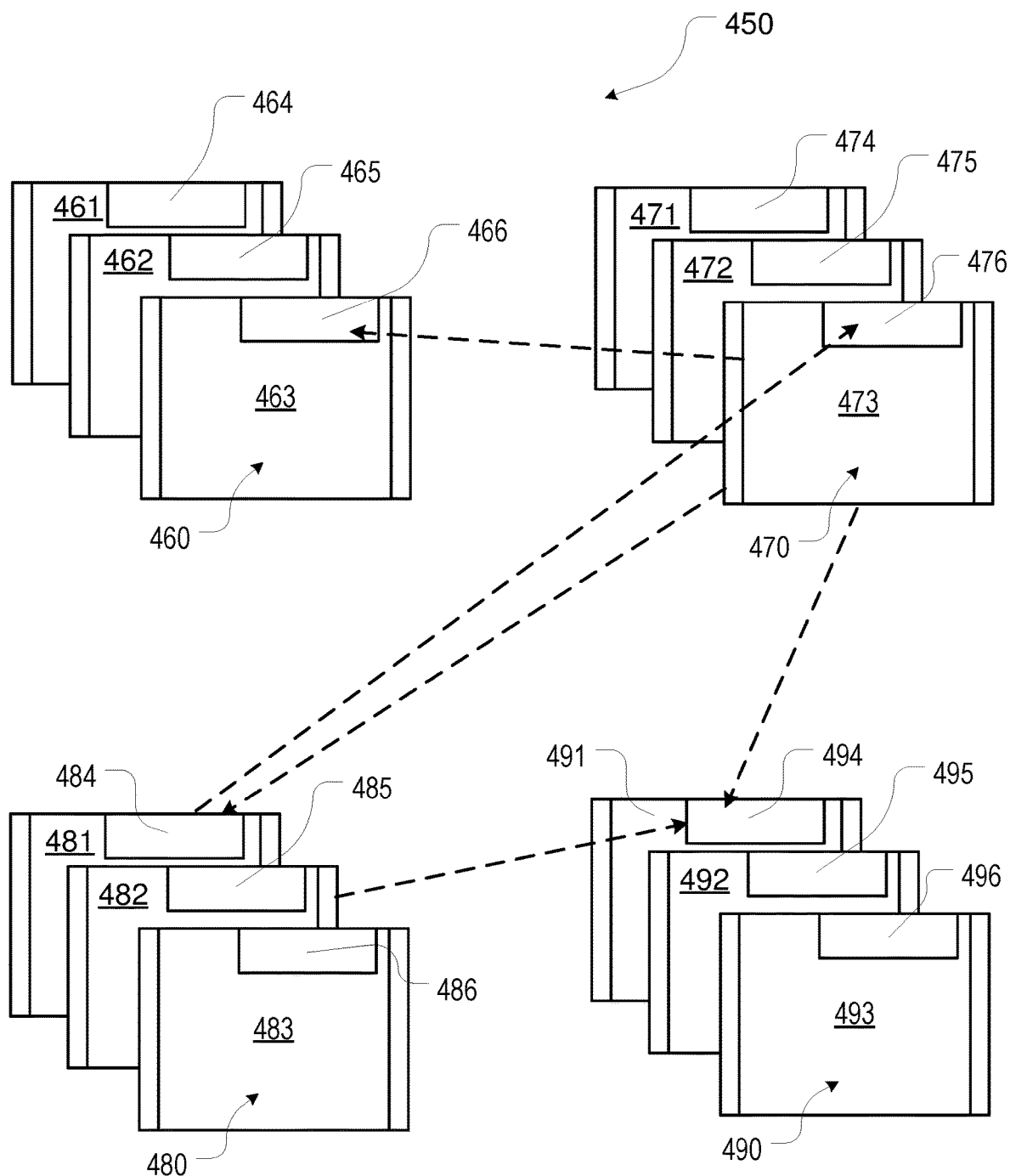
FIG. 4B depicts an example microservice-based architecture, consistent with some embodiments.

FIG. 4A depicts an example monolithic service architecture, while FIG. 4B depicts an example microservice-based architecture, both suitable for use with some embodiments. In the architecture of FIG. 4A, the monolithic service 400 may be comprised of a plurality of service instances 410, 420 and 430 executing on one or more DPS 300. Each of these service instances may include several distinct functionalities, such as functions 436 and 437 within service instance 430. The monolithic architecture in FIG. 4A may also include a data store 440 and a logging daemon 445.

In the microservice architecture 450 in FIG. 4B, applications may be structured as a loosely-coupled (e.g., fine-grained) collection of small, well-defined stateless services (referred to as microservices) executing on one or more DPS 300, which may communicate with each other only through well-defined application programming interfaces (APIs). In FIG. 4B, each functionality is in its own dedicated service. Thus, microservice 460 in FIG. 4B may comprise microservice instances 461, 462 and 463, and may generally correspond to function(s) 436 in service instance 430 in FIG. 4A, as well as the corresponding functionalities in service instances 410 and 420 in FIG. 4A. Microservice 470 in FIG. 4B may generally comprise microservice instances 471, 472 and 473, and may correspond to functions 437 in service instance 430 in FIG. 4A, as well as the corresponding functionalities in service instances 410 and 420 in FIG. 4A.

Microservice 480 in FIG. 4B may comprise micro service instances 481, 482 and 483, and may generally correspond the data store 440 in service instance 430 in FIG. 4A, as well as the corresponding functionalities in service instances 410 and 420 in FIG. 4A. Microservice 490 in FIG. 4B may comprise microservice instances 491, 492 and 493, which may generally correspond to the logging daemon 445 in service instance 430 in FIG. 4A, as well as the corresponding functionalities in service instances 410 and 420 in FIG. 4A.

As discussed above, each microservice instance may include a well-defined API. Within microservice 460, for example, instances 461, 462 and 463 may include respective APIs 464, 465 and 466. Within microservice 470, instances 471, 472 and 473 may include respective APIs 474, 475 and 476. Within microservice 480, instances 481, 482 and 483 may include respective APIs 484, 485 and 486. Within microservice 490, instances 491, 492 and 493 may include respective APIs 494, 495 and 496.

As also discussed above, microservices may communicate with each other through their APIs. Thus, in FIG. 4B, instance 473 within microservice 470 may communicate with API 466 of instance 463 within microservice 460. Instance 473 within microservice 470 may also communicate with API 484 of instance 481 within the data store microservice 480 and with API 494 of instance 491 of the logging microservice 490. In this way, an application in FIG. 4B may comprise two or more loosely-coupled and/or fine-grained microservices, with well-defined web service API(s), working together to generate responses to end user requests. Applications may be composed of hundreds of such instances of heterogeneous microservices, backed by scalable data stores. Individual microservices can be owned and operated by independent developers and/or teams. Each micro service can be developed and deployed independently of other microservices by independent teams of software developers who interact with other services only through their exposed web services' APIs. From a code development and operations perspective, each microservice has its own branch with updates to the service being committed to that branch. Services are updated frequently, independent of other services, while maintaining compatibility.

Training Module

Figure 5:
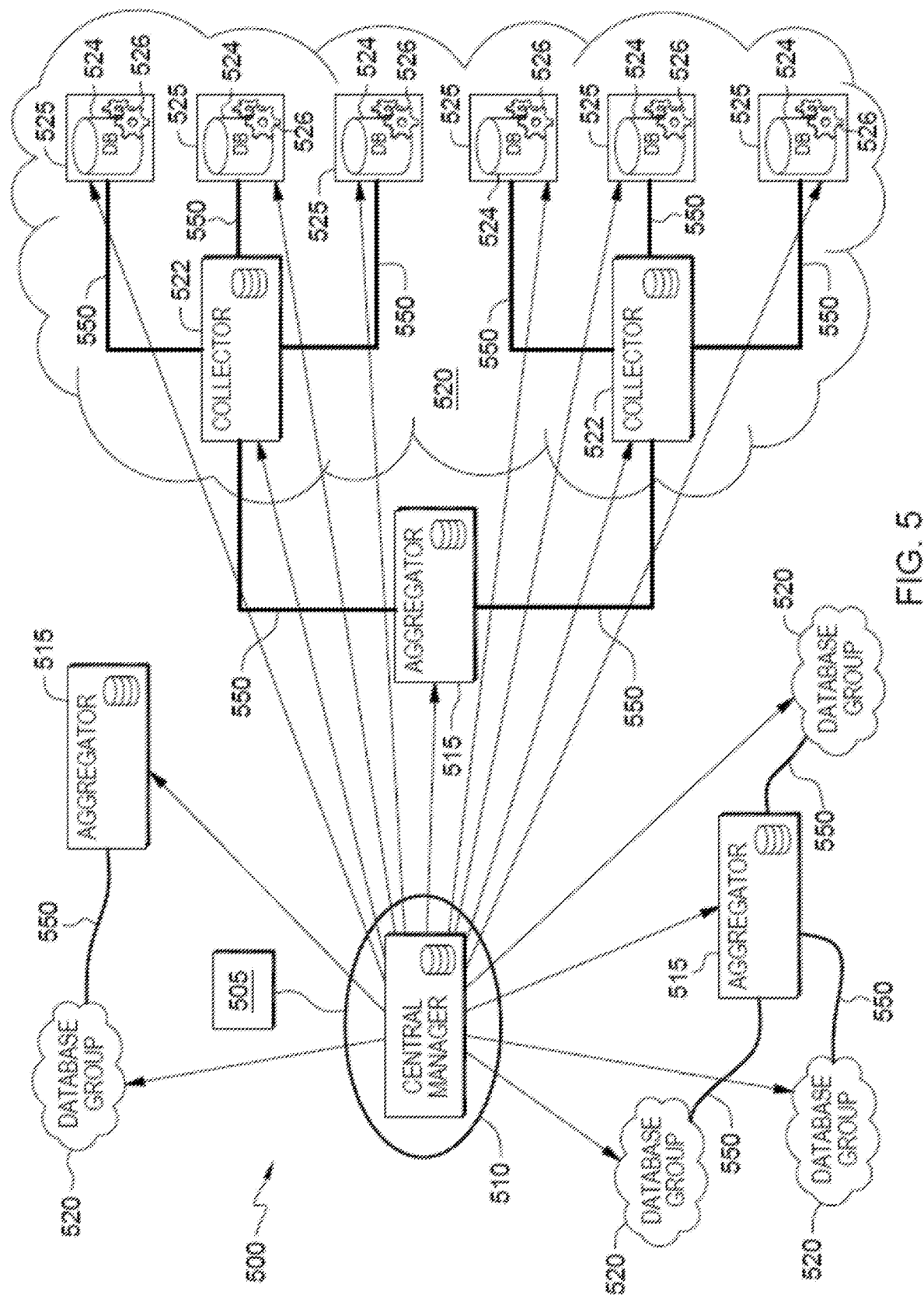
FIG. 5 is a system diagram of an example distributed database application, consistent with some embodiments, with only some of the constituent elements depicted in detail for clarity.

FIG. 5 is a system diagram of an example distributed database application 500, consistent with some embodiments, with only some of the constituent elements depicted in detail for clarity. This distributed database application 500 embodiment may comprise a central manager system 510 connected to a plurality of aggregator systems 515, a plurality of database groups 520, and a training module 505. The aggregator systems 515 in this embodiment may receive dynamically throttled log messages 550 from one or more logically associated database groups 520. Each database group 520, in turn, may comprise one or more collector services 522 that receive dynamically throttled log messages 550 from a plurality of agents 524 located on a plurality of edge nodes 525. Each agent 524 in this embodiment may include a security data logger 526 that generates and selectively transmits log messages. The agents 524 in some embodiments may be implemented as a local logging daemon 445 or a local logging microservice 490.

In operation, the edge nodes 525 may initially receive raw unprocessed data, such as access logs, and the collector service 522 may initially receive transmitted batches of that raw data for subsequent processing. In one suitable method, a security analyst may first define a rule-based detection algorithm to detect specific patterns within the transmitted data, such as a regular expression that sniffs for addresses, social security numbers, suspicious or known-problematic IP addresses, etc. These rule-sets may be transmitted from the central manager 510 to the set of collector service 522 and/or to the edge nodes 525.

During a subsequent data collection time period, batches of data transmitted from each edge node 525 may be processed using the rule-sets at the designated collector service 522. The outcome of the rule-based algorithm accumulates sets of "included" and "excluded" data that never was included in any report for subsequent security analysis. The data records in this embodiment may include not only the application layer data, but also a characterization of the software used (e.g., database name and database release level) on each edge node 525 from which the associated records originated.

The training module 505 in some embodiments may initially observe which of these data records were actually selected by human analysts for additional review for potential security problems from the data that was included in the reports. Next, the training module 505 may generate weightings to categorize these data records into one of three categories based on these observations: excluded, included, or flagged. The training process may label this three-way classification onto the data records as ground truth labels to be fed to a training process to build a labeling model.

Some embodiments may choose to create a classifier with a suitable machine learning technique, such a Bayesian decision trees, a statistical-based process, or deep learning neural net. In some embodiments, it may be desirable that a selected machine learning method be able to either produce a confidence measure associated with each instance classification label at runtime, or else transparently reveal how important individual features from the input are to the final classification judgment, so that the fidelity of the model can be modulated.

Embodiments using a Bayesian decision tree classifier may be particularly desirable because they are relatively cheap and fast to execute within the edge nodes 525. For example, a learned decision tree can store a prioritized sequence of partitioning rules that indicate the features with the most predictive power. By way of example:

first divide the data based on ATTRIBUTE1= DAYOFWEEK (achieved 50% accuracy gain in training),
then split when ATTRIBUTE2>50 (achieved 8% gain in training)
then split when ATTRIBUTE3 matches a string pattern (achieved 2% gain in training), etc.

The customized and trained classifier model may be converted to an executable process in some embodiments, and then deployed to each edge node 525.

Some embodiments may employ the executable customized and trained classifier model to dynamically throttle data transmission to reduce congestion. In these embodiments, the edge nodes 525 may have a baseline frequency of data transmission that incorporates load balancing and auto-scaling where possible. The edge agents 525 may dynamically increase or decrease the rate of data transmission from this baseline to match the moment-to-moment capacity of the collector service 522 in a variety of ways depending on the classification model used, including without limitation: (i) if the edge node 525 has spare processor and/or memory capacity to run a classification model to produce a confidence for classifying each entry as excluded/included/flagged, the edge node 525 may order and prioritize sending the "flagged" instances, sorted by confidence. The edge node may then also transmit the "included" class if sufficient capacity remains, then the "excluded" class if sufficient capacity remains. If the transmission rate needs to be reduced, the edge node 525 may send only instances labeled as "flagged," or only the "flagged" records having the highest confidence if even further reductions are required; (ii) if the edge node 525 cannot produce a confidence-ranked list of classification labels, the edge node may filter down the data set size by applying the most predictive feature cutoffs first, then iteratively applying feature-value cutoffs until the data set size is sufficiently reduced to allow transmission. The edge node 525 in these embodiments may apply more or fewer of the filtering attributes in the discrimination model to tighten the transmitted data so that it prioritizes items that match the requested data rate. If the transmission rate needs to be further reduced, then additional feature-value cutoffs may be applied; likewise, if the transmission rate can be increased, then fewer feature-value cutoffs may be applied.

In some embodiments, some of the edge nodes 525 may comprise a DPS 300 running the IBM Security Guardium® platform, available from IBM Corporation of Armonk, N.Y. These embodiments may be desirable because the Security Guardium platform includes capabilities to discover and classify data, as well as monitor and audit activity to help protect sensitive data across hybrid multi-cloud environments. However, other embodiments may use edge nodes 525 running other software platforms and/or software platforms from other vendors. The edge nodes 525 in some embodiments can even be heterogeneous executions of similar applications. For example, the edge nodes 525 may comprise a network of database endpoints in which some are running the database software from one vendor and some are running database software from a second vendor, with neither database software product being all patched to the same software levels.

Model Training

Figure 6:
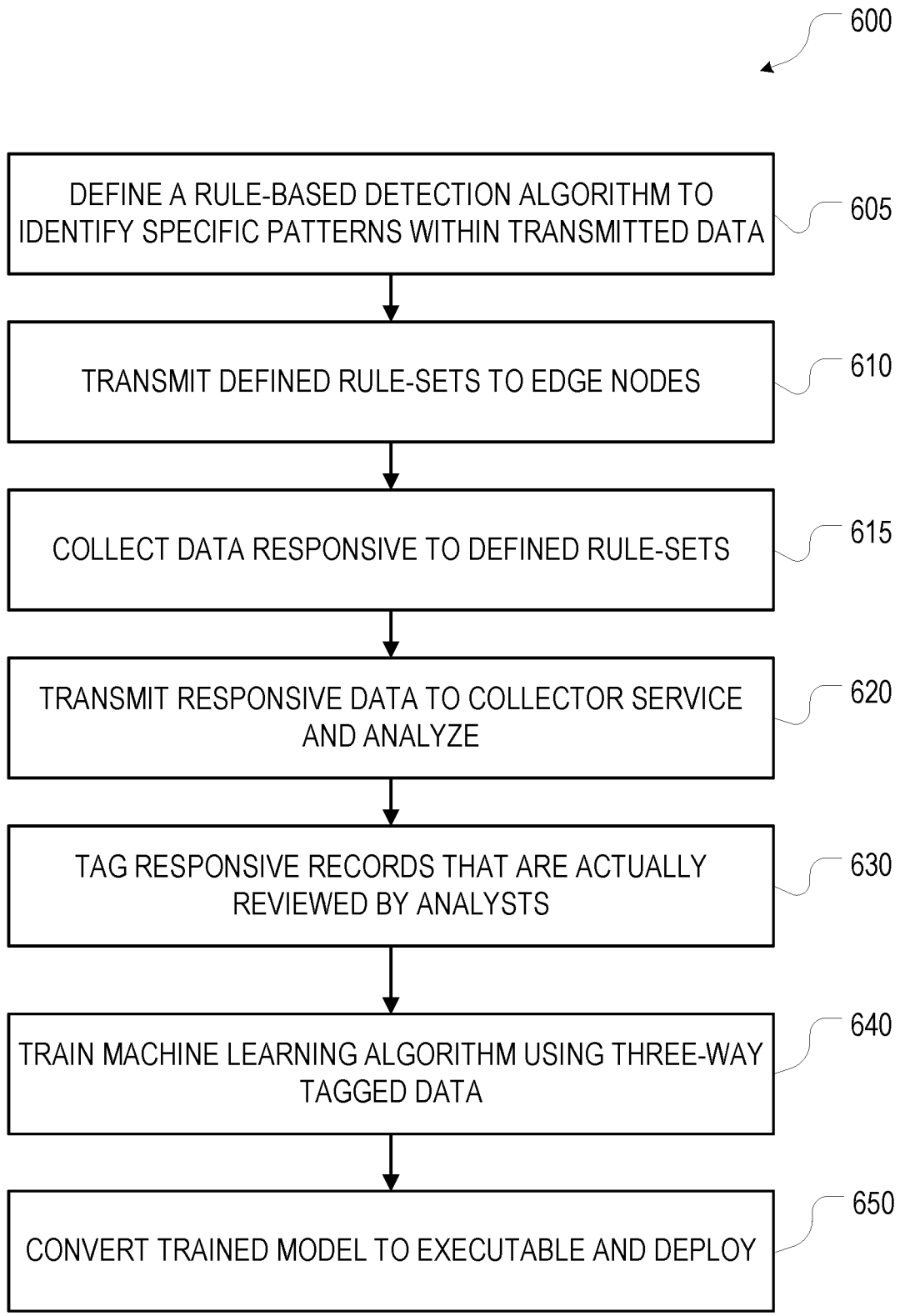
FIG. 6 is a flow chart of a process for creating a trained model executable at a training module, consistent with some embodiments.

FIG. 6 is a flow chart of a process 600 for creating a trained model executable at a training module 505, consistent with some embodiments. At operation 605, an analyst supporting a distributed application may define a rule-based detection algorithm to identify specific patterns within the transmitted data, such as a regular expression that sniffs for addresses, social security numbers, and/or suspicious ISP addresses. These rule-sets may be transmitted to a set of collector services 522 that each front a specific number of edge nodes 525 and/or to the edge nodes 525 themselves at operation 610. Next, at operation 615, data may be collected at the plurality of edge nodes 525 responsive to the transmitted rule-set. During this data collection time period, the edge nodes 525 may accumulate sets of "included" data and "excluded" data (i.e., data that never was included in any report for subsequent security analysis) as an outcome. Batches of "included" data may be transmitted from each edge node 525 to the collector service 522 at operation 620, to be processed by the analyst.

At operation 630, the training module 505 may observe which specific records in the transmitted data were actually selected and/or reviewed by the analysts for potential security problems. The training module 505 may then label those actually-reviewed records as "flagged." At operation 640, the resulting three-way tagging (i.e., "included," "excluded," and "flagged") may be used as ground truths, to be fed to a machine learning training process to determine weightings for a classifier model at operation 640. In some embodiments, the training data may optionally also include a characterization of the software used (e.g., a particular release level of a particular database) of each edge node 525 from which the data originated.

At operation 640, some embodiments may choose to create a classifier using Bayesian decision trees because the resulting classifier may be cheap and fast to execute within the edge nodes 525. In other embodiments, a statistical process or deep learning neural net may be used to create the classifier. In some embodiments, the selected method is able to either produce a confidence measure associated with each instance classification label at runtime, or else transparently reveal how important individual features from the input are to the final classification judgment, so that the fidelity of the model can be modulated.

After training is complete, the customized trained classifier model may be converted to an executable process and deployed to each edge node 525 at operation 650.

Throttling Data Transmission Rate

Figure 7:
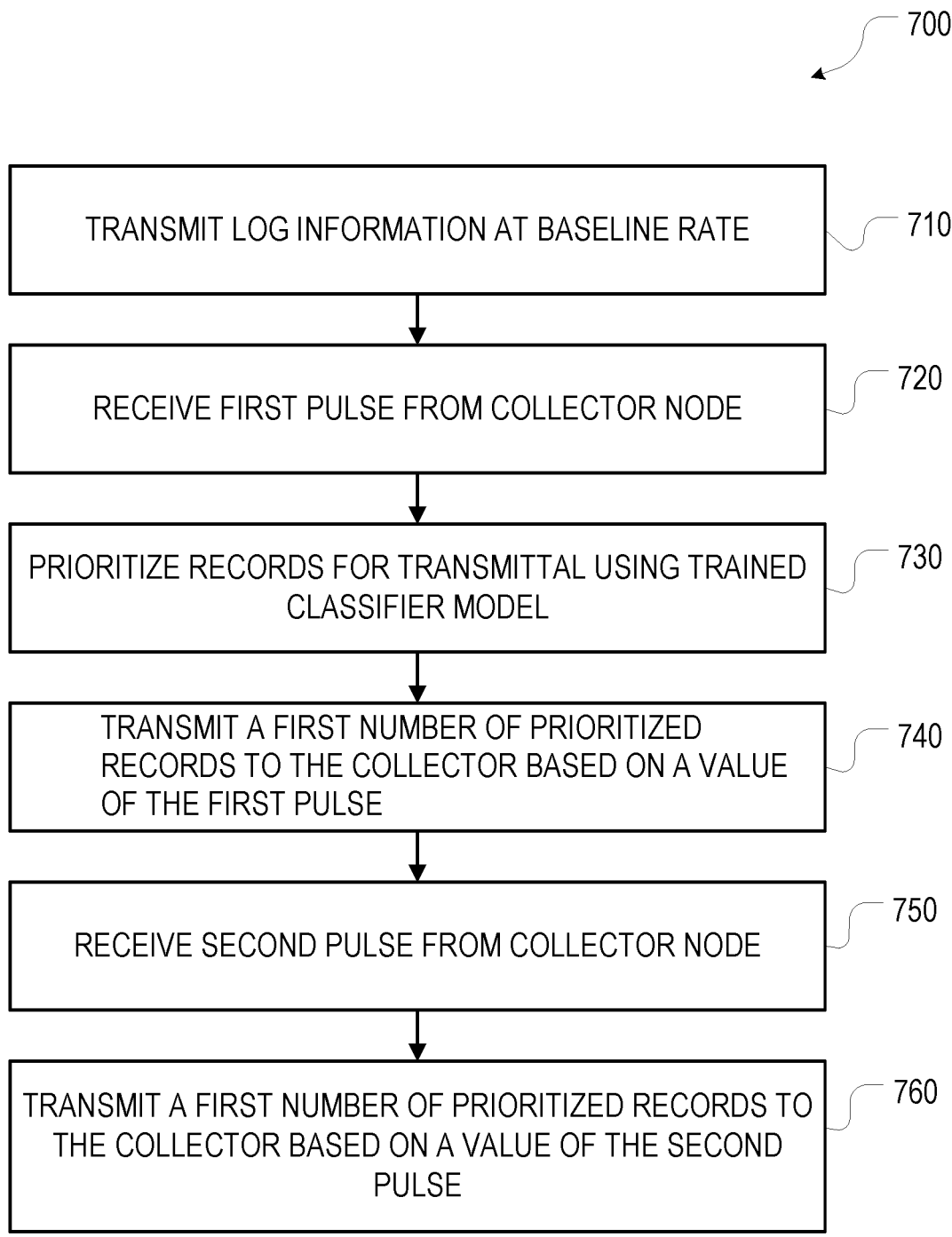
FIG. 7 is a flow chart of a process for using a trained model executable to dynamically throttle data transmission at an agent of an edge node, consistent with some embodiments.

FIG. 7 is a flow chart of a process 700 for using a trained model executable to dynamically throttle data transmission at an agent 524 of an edge node 525, consistent with some embodiments. At operation 710, the edge nodes 525 may begin transmitting data at a baseline rate that incorporates load balancing and auto-scaling where possible. At operation 720, the collector service 522 may send a pulse to each edge node 525 having a value indicating how close it is to its maximum capacity at that moment in time. Additionally or alternatively, the collector service 522 may transmits a requested throttling percent to the edge nodes 525. In response, at operation 730, the edge nodes 525 may employ the executable trained classifier model (received at operation 660) to begin prioritizing data that is important to transmit immediately from data that can be either discarded, sent later (i.e., transmission resumed during periods of lower congestion), or sampled. In some embodiments, this throttling may include running the classification model to produce a confidence for classifying each entry, and then ordering (e.g., as part of the prioritization score) the "flagged" class further confidence. In some embodiments, if bandwidth remains under the desired rate, the "flagged" class may be followed by the "included" class and then the "excluded" class. The "included" and "excluded" class may also be ordered and prioritized for transmission by confidence in some embodiments. The prioritized records may be transmitted at operation 740. In this way, the edge nodes 525 may dynamically throttle the volume of data they transmit in response to the pulses to match the current capacity of the collector service 522.

If the transmission rate needs to be further reduced, the edge nodes 525 may send only instances labeled as "flagged" ordered by highest confidence first. Alternatively, if the edge nodes 525 cannot produce a confidence-ranked list of classification labels, the edge node 525 may filter down the data-set's size by applying the most predictive feature cutoffs first, then iteratively applying the next most predictive feature-value cutoff, etc. until the data-set size is sufficiently reduced to allow transmission. The edge node 525 may apply more or fewer of the filtering attributes in the discrimination model to tighten the transmitted data so that it prioritizes items that match flagged data. If the transmission rate can be increased, the edge nodes may begin sending previously deferred data records, again grouped by the "included" class and then by the "excluded" class, starting with the oldest such record in some embodiments and with the newest such record in some embodiments.

At operation 750, the collector service 522 may send a new pulse to each edge node 525 having a new value indicating how close it has reached to its maximum capacity at that new moment in time. Additionally or alternatively, the collector service 522 may also transmit a new desired throttling percentage. In response, at operation 760, the edge node 525 may employ the executable trained classifier model (generated at operation 650) to select nodes for priority transmission based on the new pulse. In this way, the edge agents 525 may dynamically throttle the rate of data they transmit to match the current/updated capacity of the collector service 522.

Computer Program Product

Although the present invention has been described in detail with reference to certain examples thereof, it may be also embodied in other specific forms without departing from the essential spirit or attributes thereof. For example, the present invention may be a system, a method, and/or a computer program product at any possible technical detail level of integration. The computer program product may include a computer readable storage medium (or media) having computer readable program instructions thereon for causing a processor to carry out aspects of the present invention. The computer readable program instructions can be stored and executed on a single computer or divided among different computers, at the same location or different locations, for storage and execution.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

General

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects of the present invention were described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. Moreover, the flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

What is claimed is:

1. A method for controlling transmission of security audit logs based on a model comprising:
    receiving transmitted log information from a plurality of nodes;
    applying a rule-based algorithm to the transmitted log information to categorize a first batch of data as included in a security analysis, a second batch of data as excluded from the security analysis, and a third batch of data as actually reviewed in the security analysis based on a user selection;

training a classifier based on outcomes of the rule-based algorithm;
converting the classifier to run as a trained model executable on the plurality of nodes; and
transmitting the trained model executable to the plurality of nodes.

2. The method of claim 1, further comprising transmitting data from each of the plurality of nodes based on the trained model executable.

3. The method of claim 2, wherein the trained model executable transmits data at a rate based on a first pulse received from a collector.

4. The method of claim 3, further comprising dynamically throttling the rate based on the first pulse from the collector.

5. The method of claim 4, wherein dynamically throttling the rate comprises filtering data records based on weightings associated with the first batch, the second batch, and the third batch.

6. The method of claim 5, wherein dynamically throttling the rate comprises filtering data records based on a confidence in the weightings.

7. The method of claim 5, further comprising:
assigning a priority score to a plurality of records based on the weightings;
ordering records for transmission based using the priority score; and
transmitting a first number of ordered records to the collector, wherein the first number is based on the first pulse from the collector.

8. The method of claim 7, further comprising delaying transmission of a remainder of the ordered records based on the first pulse from the collector.

9. The method of claim 8, further comprising resuming transmission of the remainder of the ordered records at a later time.

10. The method of claim 7, further comprising:
receiving a second pulse from the collector; and
transmitting a second number of ordered records to the collector, wherein the second number is based on the second pulse from the collector.

11. The method of claim 1, further comprising receiving a desired throttling percentage; and transmitting data from each of the nodes based on the desired throttling percentage.

12. A computer-implement method for controlling transmission of log data based on a model comprising:
receiving a trained model executable at an edge node, the trained model executable comprising: a classifier trained to generate a priority score for a plurality of record based on weightings associated a first batch of training data included in a security analysis, a second batch of training data excluded from the security analysis, and a third
batch of data actually reviewed based on a user selection;
receiving a first pulse from a collector;
selecting a first set of records for transmission based at least in part on the priority score; and transmitting the first set of records to the collector at a rate based at least in part on a value of the first pulse from the collector.

13. The method of claim 12, further comprising:
receiving a second pulse from the collector;
selecting an additional set of records for transmission based at least in part on the priority score and on the second pulse from the collector; and
transmitting the first set of records and the additional set records to the collector at an updated rate based at least in part on a value of the second pulse from the collector.

14. The method of claim 13, wherein the first set of records comprises relatively higher priority records and wherein the additional set of records comprises relatively lower priority records.

15. The method of claim 12, further comprising training the trained model, wherein the training comprises:
receiving transmitted log information from a plurality of nodes;
applying a rule-based algorithm to the transmitted log information;
training the classifier based on outcomes of the rule-based algorithm; and
converting the classifier to run as the trained model executable on each of the plurality of nodes.

16. The method of claim 15, wherein selecting a first set of records for transmission comprises applying a confidence to the weightings.

17. The method of claim 16, wherein selecting a first set of records for transmission comprises filtering data records based on the weightings.

18. The method of claim 17, wherein selecting a first set of records for transmission comprises filtering data records based on the confidence.

19. A logging system, comprising:
a training module adapted to:
receive transmitted log information from a plurality of edge nodes;
apply a rule-based algorithm to the transmitted log information to categorize a first batch of data as included in a security analysis, a second batch of data as excluded from the security analysis, and a third batch of data as actually reviewed in the security analysis based on a user selection;
train a classifier based on outcomes of the rule-based algorithm;
convert the classifier to run as a trained model executable on the plurality of nodes; and
transmit the trained model executable to the plurality of edge nodes;
an agent associated with one of the plurality of edge nodes, the agent adapted to:
receive the trained model executable;
assign a priority score to a plurality of records using the trained model executable;
receive a first pulse from a collector;
select a first set of records for transmission based at least in part on the priority score and on the first pulse from the collector; and
transmit the first set of records to the collector.

20. The system of claim 19, further comprising one or more processors coupled to one or more memories, the one or more memories containing instructions that, when executed on the one or more processors, cause the one or more processors to implement the training module and the agent.

* * * * *